United States Patent [19]

Cresswell

[11] Patent Number: 4,708,219

[45] Date of Patent: Nov. 24, 1987

[54] DISASSEMBLABLE SULKY FOR ATTACHMENT TO A STEERABLE FRONT WHEEL ASSEMBLY CONDITION

[76] Inventor: Thomas A. Cresswell, P.O. Box 834, Palm Desert, Calif. 92261

[21] Appl. No.: 861,365

[22] Filed: May 9, 1986

[51] Int. Cl.⁴ .................. B62D 27/06; B62K 5/06; B62K 11/02

[52] U.S. Cl. ................................. 180/11; 180/208; 180/210; 180/907; 280/242 WC; 280/278; 280/287; 297/DIG. 4; 403/323; 403/330

[58] Field of Search .................. 180/11, 12, 13, 208, 180/210, 905, 906, 907; 280/287, 242 WC, 278, 289 WC; 403/323, 330, 316, 317; 297/DIG. 4, 45; 296/27, 63, 196

[56] References Cited

U.S. PATENT DOCUMENTS

| | | | |
|---|---|---|---|
| 2,818,910 | 1/1958 | Hawkins | 297/45 |
| 4,360,213 | 11/1982 | Rudwick et al. | 297/DIG. 4 |
| 4,503,925 | 3/1985 | Palmer et al. | 180/13 |
| 4,506,903 | 3/1985 | Bowermaster | 280/289 WC |
| 4,553,770 | 11/1985 | Lyman | 288/289 WC |

*Primary Examiner*—John J. Love
*Assistant Examiner*—Mitchell J. Hill
*Attorney, Agent, or Firm*—Learman & McCulloch

[57] ABSTRACT

A demountable sulky, which may be readily coupled and uncoupled to a steerable, motor-driven front wheel assembly, incorporates a T-bar having hoe-like blades provided on each of its ends, which are received in scabbards provided on the drive wheel assembly, and each of a pair of rear wheel frames. Latching mechanisms are provided to releasably, rigidly lock the hoe-like blades in position. Further, a releasable brace or rung bar component is used to auxiliarly, detachably lock the rear ends of the rear side wheel frames in rigidly spaced apart position in a safe and secure manner.

31 Claims, 17 Drawing Figures

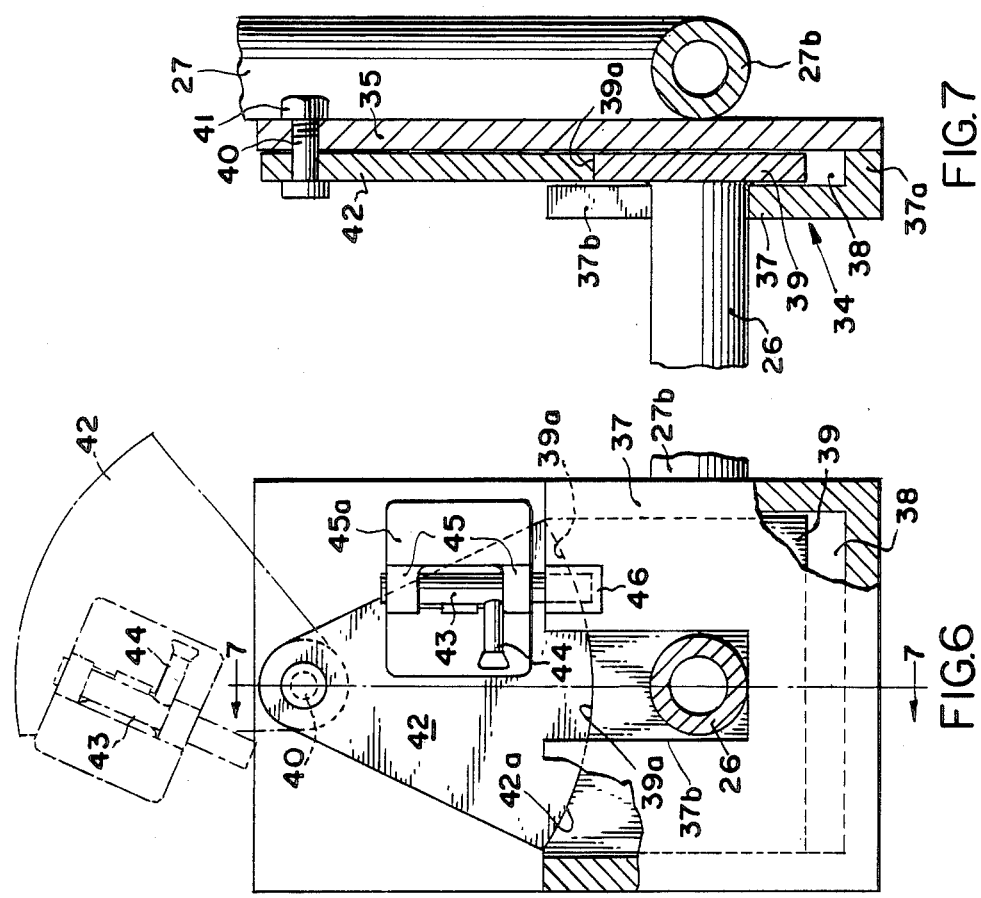
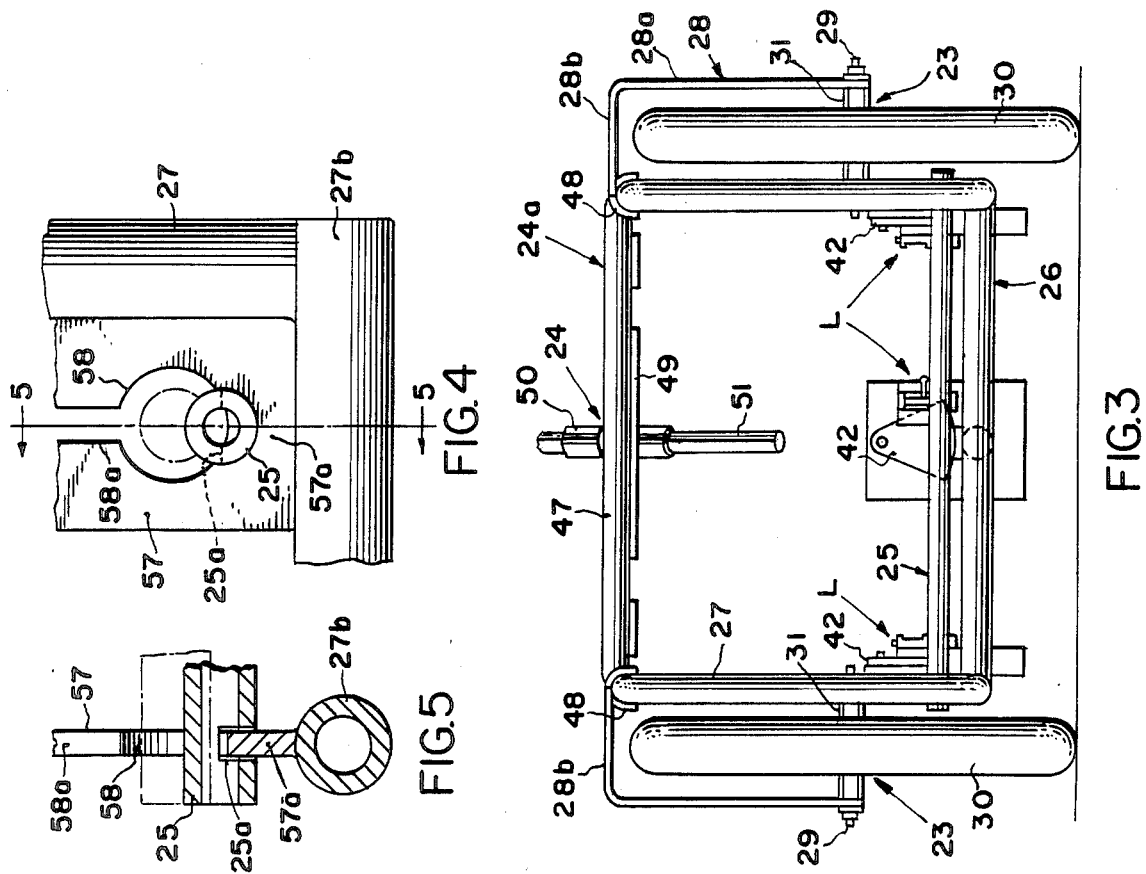

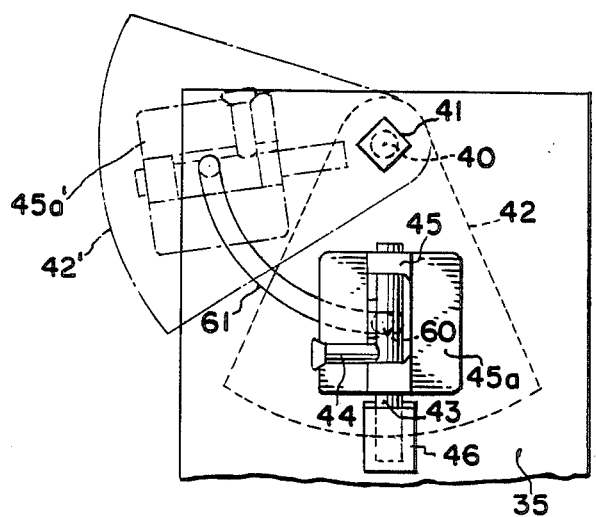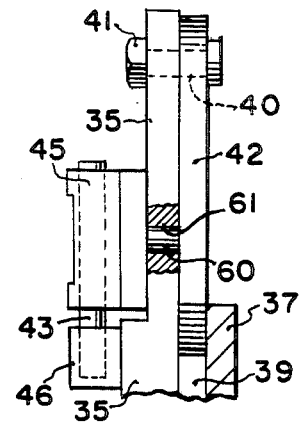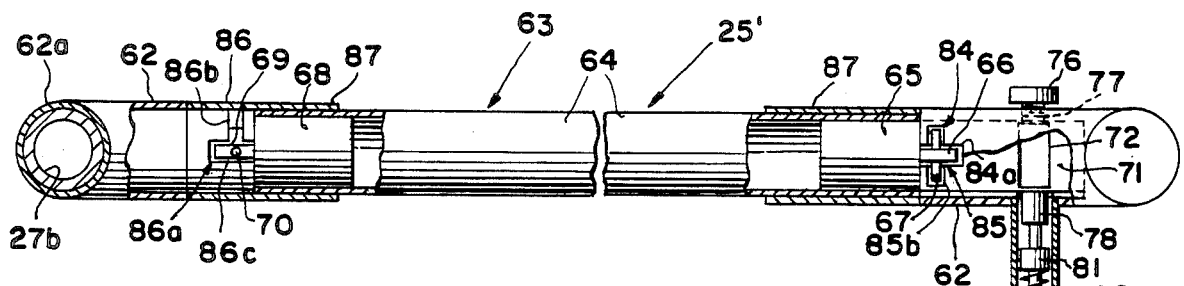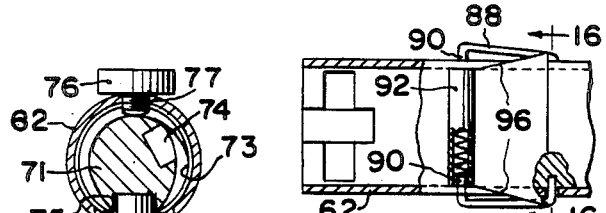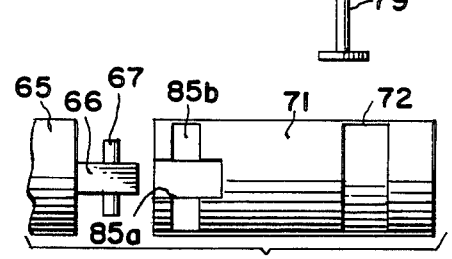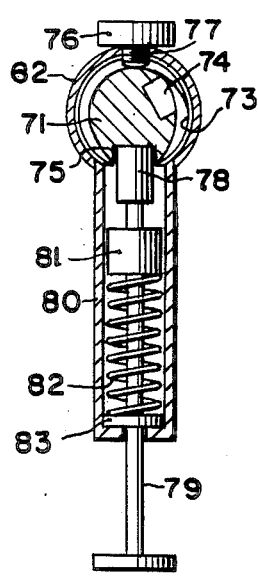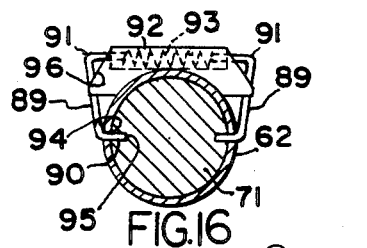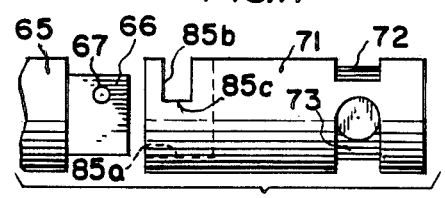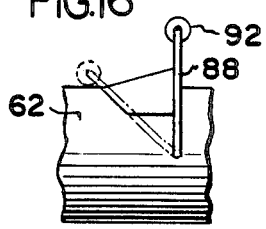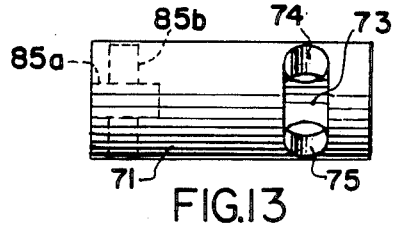

DISASSEMBLABLE SULKY FOR ATTACHMENT TO A STEERABLE FRONT WHEEL ASSEMBLY CONDITION

FIELD OF THE INVENTION

This invention relates to knockdown sulky components which rigidly latch in assembled position, but are readily diassemblable to fit easily into an automobile trunk.

BACKGROUND OF THE INVENTION

Recently it has been possible to commercially purchase a motorized power unit which can be coupled to a conventional occupant-propelled wheel chair, to motorize the chair when desired. Normally these attachable, drive units comprise a front wheel, driven by an electric motor which is supported on a steering post-frame assembly, which further supports a battery for supplying the necessary electrical current to the electric motor. A typical such powered unit is disclosed in U.S. Pat. No. 4,503,925, and other examples of such units are disclosed in U.S. Pat. No. 3,921,744.

Because conventional wheelchairs are bulky, it is not possible to easily transport them in even the larger automobiles. Even when the wheelchair is of the foldable type, and can be placed in the vehicle trunk, it leaves practically no room in the trunk for anything else, and the motorized drive unit needs to be separately transported in the vehicle.

The present invention relates to personal vehicles, particularly for patients and others who have some physical disability, but are sufficiently physically active to be able to assemble and disassemble a demountable sulky, and transfer the components to and from a vehicle trunk.

Heretofore, no seat-bearing vehicle, which could be broken down into compact component pieces to facilitate ready storage in an automobile trunk, which necessarily carried other items such as baggage to be used on a trip of several days, has been commercially available. One of the prime reasons is believed to have been the lack of a safe and rigid latch system which could be engaged and disengaged by hand without the use of tools. Latching systems of various types have been proposed for various vehicles, and are disclosed, for instance, in U.S. Pat. Nos. 4,452,327 and 4,203,612, but none of the these demountable vehicular latch constructions satisfy all the criteria.

SUMMARY OF THE INVENTION

One of the prime objects of the present invention is to design a demountable sulky which readily disconnects from the drive unit which provides its driven front wheel, and then further can be readily broken down by a handicapped person into separate component parts which will readily fit into available spaces in an otherwise packed automobile trunk for transport.

Still another object of the invention is to provide a sulky unit which essentially breaks down into separate rear wheel frames, a T-bar, and a seat-bearing frame, none of which, when separated from the others, takes up much space.

Still a further object of the invention is to provide a virtually fool-proof latching system, for connecting the various sulky elements, which can be easily manipulated, without the use of tools, by handicapped persons, to permit them to easily disassemble and transport the component parts, and then, after arriving at the destination, rapidly reassemble the sulky for use.

Another object of the invention is to provide a readily manfactured, demountable, rear wheel frame brace, latching system which rigidly spaces the rear wheel frames, while providing for ease of assembly and disassembly.

The present invention concerns a sulky which may be readily coupled and uncoupled to a steerable, motor driven, front wheel assembly. The sulky includes a T-bar, having hoe-like blades provided on each of its ends, and a latching device on the drive wheel assembly, and each of a pair of rear wheel frames, which rigidly receives the hoe-like blades and which can be manipulated to lock them in rigidly assembled position. Of special interest also is the brace bar component for detachably locking the rear wheel frames in spaced apart position in a safe and secure manner.

Other objects and advantages will become apparent by reference to the drawings, and the following specification wherein:

FIG. 3 is a fragmentary, rear elevational view, taken on the line 3—3 of FIG. 2;

FIG. 4 is a fragmentary, side elevational view, on an enlarged scale, of the encircled area 4—4 of FIG. 1;

FIG. 5 is a fragmentary, sectional view, taken on the line 5—5 of FIG. 4;

FIG. 6 is a fragmentary, transverse, sectional view on an enlarged scale, taken on the line 6—6 of FIG. 2, the chain lines illustrating a disengaged position of the latch used;

FIG. 7 is a fragmentary, elevational view, taken on the line 7—7 of FIG. 6;

FIG. 8, is a fragmentary, elevational view, disclosing an alternate latch embodiment, the broken lines indicating the latch device swung to an open position to permit disassembly of the parts;

FIG. 9 is an edge elevational view thereof;

FIG. 10 is a top plan view of an alternate form of detachable wheel frame brace bar;

FIG. 11 is an enlarged, fragmentary, top plan view showing parts of the brace bar in disassembled position;

FIG. 12 is a side elevational view of the parts shown disassembled in FIG. 10;

FIG. 13 is a view of the wheel frame post to which the brace bar connects; and

FIG. 14 is an enlarged, sectional view, illustrating a detent device for holding an attaching plug in the wheel frame sleeve;

FIG. 15 is an enlarged, fragmentary, section plan view of an alternate form of detent device;

FIG. 16 is a transverse, sectional view taken on the line 16—16 of FIG. 15; and

FIG. 17 is a side elevational view of the device illustrated in FIG. 15 showing it in the unlocked position, the broken lines indicating the unloaded position of the detent operating handle.

Figure 1:
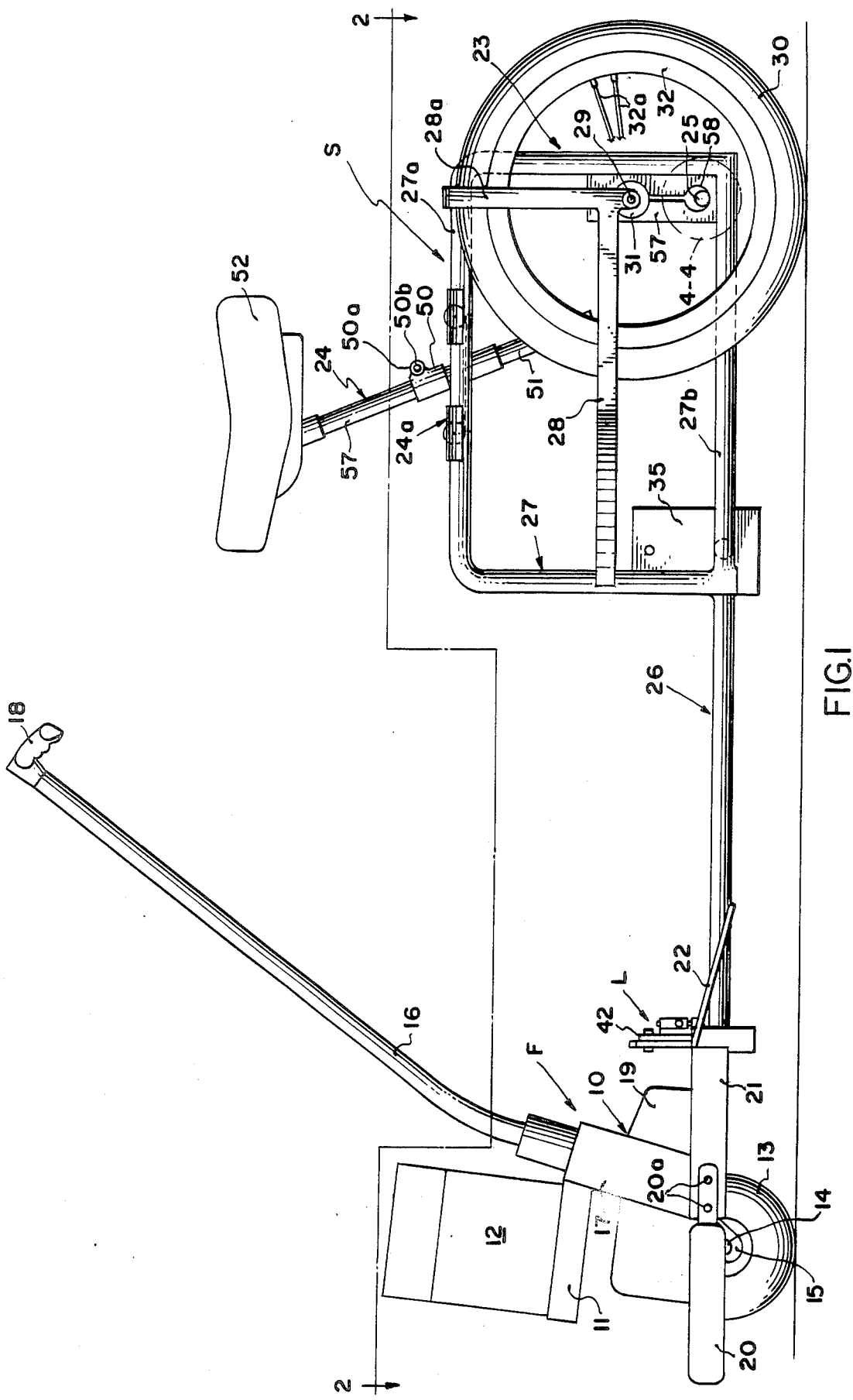
FIG. 1 is a side elevational view.
Figure 2:
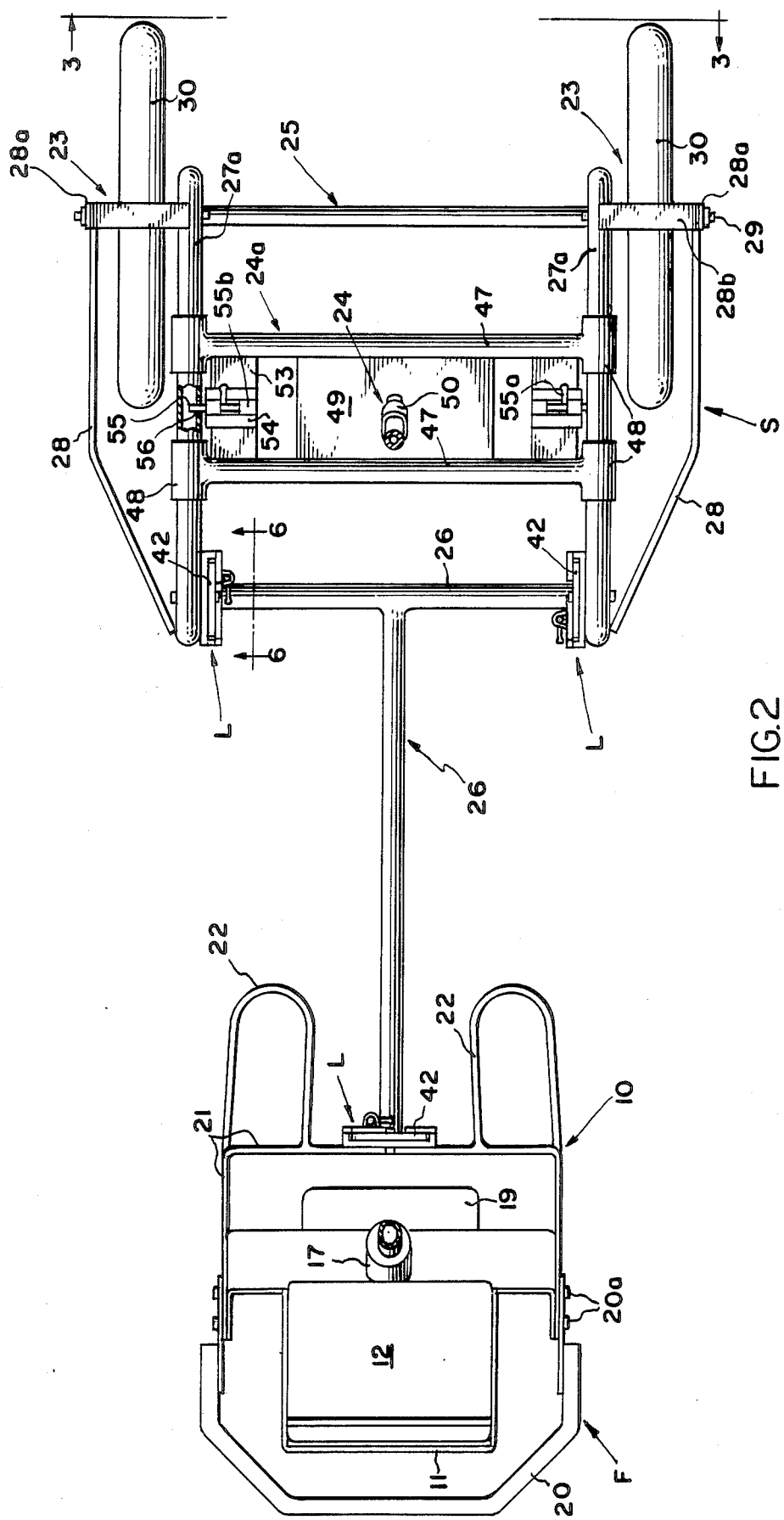
FIG. 2 is a top plan view, taken on the line 2—2 of FIG. 1.

Referring now more particularly to the accompanying drawings, and in the first instance to FIGS. 1 and 2, wherein a fully assembled three-wheeled vehicle is depicted, it is to be understood that the front wheel assembly, generally designated F, is available in the marketplace as a steerable drive wheel assembly which can be detachably connected to a wheelchair. In this connection, attention is directed to U.S. Pat. No. 4,503,925, wherein such a powered and steerable front wheel assembly is disclosed.

As disclosed in the aforementioned patent, the front wheel assembly may comprise a frame, generally designated 10, and including a holder or platform 11 for a battery 12. Steerable front wheel 13 is supported by an axle 14, carried by wheel forks 15, which are connected to a steering post 16. Post 16 is journaled for rotation by the frame F, in a steering post socket assembly 17. The steering post 16 is formed in two parts, the upper of which is detachable from the lower, and includes a pair of steering handles 18. Controls may be provided on the handles 18 for controlling the speed of travel of the wheel 13 which is powered by an electric motor (not shown) housed in motor housing 19, and connected with and driving the live axle 14.

A bumper 20 is fixed as at 20a, to a generally U-shaped frame section 21, which forms part of the frame assembly 10. As FIGS. 1 and 2 particularly indicate, foot rests 22 can be welded to the frame piece 21 at each side thereof.

The rideable sulky assembly, generally designated S, is comprised of a pair of detachable rear wheel assemblies, generally designated 23, which are individually demountable, a demountable seat assembly, generally designated 24, a detachable brace rod 25, and a detachable connecting or tow bar, generally designated 26. Each of the wheel assemblies 23, includes a generally rectangularly shaped (in side elevation) tubular wheel-mounting frame 27, provided with an outrigger frame piece generally designated 28. The outrigger 28 functions with the frame 27 to support the dead axle 29 on which the hub 31 of a wheel 30 is journaled. Spokes 32a extend between the rim 32 of each wheel and its hub 31 in the usual manner, and suitable pneumatic tires are provided on each rim 32. Each outrigger member 28 has an upstanding strap 28a, from which a horizontal portion 28b extends over to fix to the upper rail portion 27a of tubular frame 27.

The connecting member or towbar 26, which is shown in FIG. 2 as a T-shaped member, is detachably connected to each of the rear wheel frame assemblies 23, and to the front wheel assembly F, by an identical latch mechanism, generally designated L which is particularly disclosed in FIGS. 6 and 7. Each of the latch mechanisms L includes a scabbard housing 34, made up of a back plate 35, which is fixed to one of the frames 27 in FIG. 7, and a front plate 37, it being understood that identical housing 34 is also fixed to the other frame 27 and to frame 21. Also provided as part of each latch assembly is a spacer 37a which rigidly connects the plates 35 and 37, and defines the slot or recess 38 between the plates 35 and 37. As FIGS. 6 and 7 indicate, the upper end of each front plate 37 is slotted as at 37a, to pass one of the ends of tubular towbar member 26. A hoe-like lock plate 39, having a curvilinear upper face 39a, is fixed on each of the three ends of T-bar 26 for reception within the space 38 between the walls 35 and 37 of each scabbard housing 34.

Rotatably connected to each of the plates 35, as by a bolt 40, which is secured by a nut 41, is a latching plate 42, having a complementarily curvilinear surface 42a, which, when the latch parts are in the locked position shown in FIG. 6, mates with the surface 39a on the plate 39. To prevent rotation of the plate 42, once it is in the position shown in FIG. 6, a slide bolt 43 is provided, which has a manipulating handle 44 in the usual manner. Each slide bolt 43 is slidably and rotatably journaled by the integral, curvilinear bearing straps 45 provided on the slide bolt base plate 45a which fixes to each plate 39, and as will be seen in FIG. 6, can be moved downwardly to engage within the curvilinear socket strap 46 fixed to each plate 37.

The latch assembly L which secures the three identical ends of the tow bar 26 is identical, and, accordingly, a description of one will suffice for all. In the assembly of the sulky, once the latches L have been manipulated to couple tow bar 26 to the front wheel assembly F, and to each of the rear wheel assemblies 23, as shown in FIG. 2, the seat assembly 24 may be mounted in place. As disclosed particularly in FIG. 2, the assembly 24 includes mount frame 24a, which consists of a pair of transversely disposed tubular members 47, having semi-cylindrical end pieces or saddles 48 configured to fit over the tubular top members 27a of each of the rear wheel side frames 27. The tubular members 47 are connected by a central plate 49, on which an upstanding socket 50 is fixed to receive the seat post 51 of a riding seat 52 in the usual manner. The socket 50 has ears 50a which may be compressed by the clamping screw 50b to close socket 50 to tightly clamp seat post 51.

As FIG. 3 particularly discloses, the seat assembly 24 simply rests on the top bars 27a of the frames 27. Straps 53 connect the transverse members 47 at their ends, and a latch bolt assembly 54 is provided on each of the straps 53, the latch bolt construction being identical to the one shown in FIG. 6 and previously described, and having a slidable and rotatable latch bolt 55 which is receivable in an opening 56 which is bored in the tubular top bar 27a to receive it. It is in this manner that the seat assembly 24 is detachably latched in position at each side. Each latch bolt 55 is manipulated by a handle 55a and is slidable in the spaced apart curvilinear, base plate straps 55b provided on each assembly 54.

As FIGS. 4 and 5 disclose, at their rear ends, each of the rear wheel frame members 27 is positively spaced by the brace rod 25. Each frame 27 has a plate 57 which is welded in position and formed with an upwardly opening keyhole slot 58. The demountable sleeve brace 25 is notched or grooved as at 25a at each end to receive the marginal tongue or key portion 57a, formed on plate 57 by providing the keyhole slot 58 in each plate 57, and it will be seen that the reduced size, upper portion 58a of each opening 58 is of sufficient diameter to pass the sleeve 25, so that it can fit down over the portions 57a of plates 57.

In FIGS. 8 and 9, a modification of the latching mechanism L disclosed in FIGS. 6 and 7 is illustrated, and, for purposes of convenience, the same numbers have been used to indicate identical parts. In this embodiment, the draw bolt plate 45a is fixed to a pin 60, which is fixed to swingable latch plate 42 and extends through a curvilinear slot 61 provided in the plate 35, to dispose the draw bolt 43 on the exterior face of the rear wheel frame 27. The socket 46, which receives draw bolt 43, is accordingly, provided on the exterior side of plate 35 to receive it. As the broken line representations of the swing plate 42' and slide bolt base plate 45a' in FIG. 8 clearly indicate, plate 45a' similarly, however, moves with the plate 42'.

FIGS. 10 through 13 designate an alternate form of brace rod which I have generally designated 25'. To rigidfy the construction, each of the rear wheel frames 27 has, at its lower rear end, an integral inwardly projecting sleeve 62, and it is within these sleeves 62 that a detachable rung or arbor, generally designated 63, is demountably received. The construction, which I will presently describe, has the capability of resisting tension stresses, as well as compression forces, and can only be released by the direct and intentional action of someone seeking to disassemble it.

The assembly 63 includes a central tube 64, which at one end rigidly fixes an internal core or plug 65, having an axially projecting prong or tongue 66 with an offset pin 67 rigidly projecting from each side thereof. At its opposite end, the sleeve 64 has a rigidly fixed plug or core 68, provided with an axially projecting tongue 69 having a pin 70 which projects from only one side thereof. The sleeve 62 on each rear wheel 27 projects from a sleeve 62a which rigidly fixes to the lower rung or rail 27b at its rear end. At the right end of the brace bar assembly in FIG. 10, the sleeve 62 is provided with a plug 71, which is more particularly disclosed in FIGS. 12 and 13. Plug 71, at its inner end, is provided with an arcuate groove 72, and an opposite arcuate groove 73. Provided in the groove 73 for a purpose to presently become apparent, are a pair of circumferentially spaced, blind bores or openings 74 and 75. A set screw 76 can be threaded into an opening 77, provided in sleeve 62, to extend into groove 72 and prevent endwise displacement of the plug 71 without interfering with its rotation.

The rotary position of the plug 71 can be releasably maintained in one of two positions, by a detent 78 which seat in one of the openings 74 or 75. Detent 78 is mounted on a plunger 79, which is movable within a housing 80, fixed to the sleeve 62. Plunger 79 has a collar 81 fixed to it such that a coil spring 82, provided in the housing 80 around rod 79, and between the collar 81 and a slide bearing 83 for rod 79, normally, urges the detent 78 inwardly. Detent 78 can be removed from either the bore 74 or the bore 75, by pulling outwardly on the plunger 79 and further compressing the ring 82.

Provided in the end of the sleeve 62 at the right end of the assembly in FIG. 10, is a cruciate opening, generally designated 84, which includes an axial portion 84a which passes tongue 66, and radial portions 84b for passing the projecting ends of the pin 67. A similar curciate opening generally designated 85 is provided in plug 71 to mate with opening 84 and receive the element 66 and 67. Opening 85 includes axial portion 85a and radial portions 85b. The portion 85b is shallower, and includes a wall 85c. When plug 71 is in the position shown in FIGS. 10 and 11, cruciate openings 84 and 85 are upwardly open and the tongue 66 and pin 67 can be dropped vertically down into the opening 85. When the detent 78 is accommodated in the bore 74, it will hold the plug 71 in this open, rung (63)—receiving position. It is when the brace rung 63 is rotated somewhat to a position in which the detent 78 is receivable in the bore 75, that the rung 63 is in the locked position. The reason for designating one position of the rung 63 as the unlocked position, and the other as the locked position, will presently become apparent when the opposite end of the removable rung assembly 63 is described.

Fixed within the sleeve 62 at the left-hand end of the assembly in FIG. 10, is an inner sleeve 86 whose end is provided with a T-shaped bayonet opening, generally designated 86a. Opening 86a includes a notch 86c which is open to the end of the sleeve 86, in position to receive the tongue 69, when the parts are in the positions shown in FIG. 10. The slot 86 also includes a groove portion 86b, extending at right angles to the groove portion 86c at a spaced distance inwardly from the end of the sleeve 86, and it is this portion which receives the pin 70 when the rung assembly 63 is rotated. When the rod 64 is rotated, pin 70 enters the groove portion 86b and prevents endwise displacement of the rung assembly 63. At the same time, the plug 65, members 66 and 67, and the plug 71 are caused to rotate until bore 75 is opposite the detent 78. This rotation can only occur if the plunger is 79 is pulled upwardly to release the detent 78 from the bore 74 in the first place. Plainly, the detent 78 will also prevent endwise movement of the rung assembly 63.

Provided at each end of the rotatable rung assembly 63 are telescoping sleeves 87 which can be moved endwisely to cover the exposed grooves 86a and 84. When it is desired to disassemble the rung assemblies 63 from the end frames 27, sleeves 87 are both moved inwardly along the sleeve 64 to a removed position. Plunger 79 is then pulled outwardly and the assembly 63 can be rotated in the return direction to dispose the pin 70 in the portion 86c of slot 86a. This rotation will also rotate plugs 71 and 65, with the result that the members 66 and 67 are rotated from under sleeve 62 to the open position aligned with cruciate opening 84. When plunger 79 is released, detent 78 will enter bore 74 and hold the plug 71 in this position, and plainly rod assembly 63 can then simply be lifted vertically and removed.

An alternate form of detent assembly is disclosed in FIGS. 15-17. Here the various parts are provided with the same identifying numerals. Instead of the detent 78, a bale-shaped handle, generally designated 88, is provided. Handle 88 comprises a pair of rods 89, having inturned detent ends 90, and opposite inturned ends 91. Inturned ends 91 are rotatably and slideably received within a cylindrical housing 92, which also houses a coil spring 93 which bears on the ends 91, and normally forces them in an outward direction. Provided in the sleeve 62, to receive the detent ends 90, are openings 94, and provided within the plug 71 are the complementary openings 95. Plug 71 is locked in a particularly position of rotation when the handle 88 is in the position shown in broken lines in FIG. 17, in engagement with the sleeve 62. Provided on the sleeve 62 are wedge surfaces 96, which, when the handle 88 is swung upwardly to the solid line position in FIG. 17, function to spread the legs 89 and remove them from the openings 94. In this position of the handle 88, the plug 71 is free to rotate in the sleeve 62. Thus, the assembly 63, including plug 71, can be moved between the locked and unlocked positions, and, when the handle is in the raised FIG. 16 position, plug 71 is unlocked and free to rotate. When the handle 88 is in the swung down position shown in FIG. 17, the pin 70 will be disposed within the portion 86b of the bayonet slot 86 and plug 71 will be locked to the sleeve 62.

While I have disclosed the latch mechanisms L and the brace rod assemblies 25 and 25' as operative with a demountable sulky, it should be readily apparent that they are similarly operable with readily disassembled wheelchairs for safely securing the wheel frames in rigidly spaced relationship.

While only several embodiments of the invention have been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

What is claimed is:

1. A collapsible three-wheeled, vehicle for the handicapped and others desiring assistance comprising:
   a. a front wheel drive unit comprising a steering column assembly with a motor driven wheel journaled on the lower end thereof, the assembly mounting a motor for driving the wheel;
   b. a demountable towbar having a front-to-rear extending front portion, and a pair of transversely extending rear portions extending generally perpendicularly to said front portion, each portion terminating in a leg with a hoe-like blade fixed thereon at right angles to the leg and extending downwardly therefrom;
   c. slit-like, transversely extending socket means on said steering column assembly, open at its upper end for receiving the blade on said front portion;
   d. a pair of transversely spaced apart, separately demountable, front to-rear extending wheel frames, each having a stub axle for mounting a rear wheel, and journaling a rear wheel on its axle;
   e. front-to-rear extending, slit-like socket means on each wheel frame open at its upper end for receiving one of the blades on the rear portions of said towbar;
   f. a stop movably mounted on each of said wheel frames and steering column assembly for movement transversely to and from a first position engaging the upper portion of each said blade to prevent its disengaging movement out of said socket means and a remote location in which it does not prevent disengagement;
   g. latch means for releasably locking each stop in its first position;
   h. and a seat and brace means spanning and detachably secured to each of said wheel frames to integrate them and maintain them in rigidly spaced relation.

2. The invention defined in claim 1 wherein each of said socket means includes a plate parallel to said blade, and having a slot open at its upper end to receive the leg on one of said portions.

3. The invention defined in claim 2 in which the upper end of each of said blades is concave, and each stop comprises a swing plate having a lower convex surface matching the concavity of said blades, mounted to swing about an axis of pivot on said steering column assembly and rear wheel frames respectively which is generative of each convex surface.

4. The invention defined in claim 3 in which each latch means comprises slide pins and keeper socket means, provided on each of said swing plates and socket means.

5. The invention defined in claim 4 in which the upper end of each of said socket means lies in substantially a common horizontal plane.

6. The invention defined in claim 1 wherein said seat and brace means includes a seat frame disengageably connected to the upper end of each of said wheel frames forwardly of said axles, and a brace rod assembly disengageably connected with each of said wheel frames near the rear ends thereof.

7. The invention defined in claim 6 wherein said wheel frames are generally rectangular open frames having upper front-to-rear extending upper rods, and said seat frame comprises a pair of front-to-rear spaced rods spanning said upper rods of the wheel frames and provided with saddle ends resting thereon; there being disengageable pin and socket latch means carried by said seat frame and upper rods for releasably integrating said seat frame with the wheel frames.

8. The invention defined in claim 7 wherein said wheel frames have lower rods, and front rods connecting said upper and lower rods of the wheel frames, and said socket means for each wheel frame is fixed at the lower front corner of each wheel frame to the front and lower rods thereof.

9. The invention defined in claim 6 wherein said brace rod assembly comprises a rigid rod, and means releasably interconnecting the ends of said rod to said wheel frames, and brace lock means incorporated with said interconnecting means for assisting said blades on the rear portions of the towbar in preventing transverse shifting movement of said wheel frames toward and away from one another.

10. The invention defined in claim 9 wherein said brace lock means comprises a tongue and groove connection.

11. The invention defined in claim 10 wherein said tongue and groove connection is formed by a downwardly opening groove in each end of the rigid rod at a spaced distance transversely from the blade on said leg of the front portion.

12. The invention defined in claim 11 wherein each tongue is formed by a plate, integral with each wheel frame, and having an upwardly opening keyhole slot, the said slot at its upper end being of a size to pass said rod and the brace rod groove fitting down over the marginal edge of the lower marginal edge of the slot.

13. The invention defined in claim 9 wherein said brace rod assembly comprises a sleeve extending integrally transversely inwardly from each wheel frame near the rear end thereof, and a rigid, rotatable rod having its ends received in said sleeves, each sleeve providing a bayonet slot in its end and there being a projection on each end of the rod receivable in said bayonet slot such that rotation of said rod seats the projection in the bayonet slot in each sleeve in a manner to prevent axial movement of said rotatable rod.

14. The invention of claim 13 in which one sleeve carries a plug which is rotatable between rod locking and unlocking positions.

15. The invention of claim 14 in which said plug is releasably held in locked and unlocked positions by detent means.

16. The invention of claim 14 in which said plug has a pair of circumferentially spaced bores, either of which receives said detent means dependent on whether the plug is in a rotary position of lock or unlock.

17. The invention of claim 16 wherein said detent means comprises a U-shaped element pivotally mounted on said one sleeve to swing from a position generally flush with said sleeve to a raised position, the U-shaped element having spring legs with inturned terminal ends projecting transversely to said sleeve, and the sleeve having openings to receive said ends opposite said bores, there being cam means on said sleeve in the path of the legs of said U-shaped element to spread them and release said inturned ends from said bores to permit rotation of said rod and plug relative to said one sleeve.

18. The invention of claim 17 wherein said U-shaped element comprises a central tube with an internal coil spring means, the legs of the U-shaped element having inturned portions received in said tube and urged outwardly by said coil spring means such as to normally urge said detent inturned ends toward locked position in said bores.

19. A demountable three-wheeled sulky vehicle for the handicapped and others desiring assistance comprising:
   a. a steerable front wheel unit comprising a steering column mounting assembly connected with a steerable front wheel;
   b. a demountable rear frame assembly connected with said unit, having a front-to-rear extending front portion, and a pair of transversely extending rear portions extending oppositely generally perpendicularly to said front portion, each of the front and rear portions terminating in a leg;
   c. blade and scabbard means including an interacting transversely extending hoe-like blade component and a transversely extending scabbard component comprised of closely spaced transversely extending parallel plates defining a blade-receiving slit open at one end and sized for snugly receiving said blade component;
   d. a pair of transversely spaced apart, separately demountable, rear wheel assemblies supporting the legs of each of said rear portions;
   e. disengageable coupling means for securing the leg of the front portion of the rear frame assembly to the steerable front wheel unit and for securing said rear wheel assemblies to said legs of said rear portions, and including at least one of said blade components and one of said scabbard components, with the blade component received in coupled position in the scabbard component;
   f. latch means for releasably locking said blade and scabbard components in coupled position; and
   g. a seat means supported by said rear frame assembly.

20. The invention defined in claim 19 wherein one of said scabbard plates has a slot open to said slit and sized for receiving the leg on the one of said portions on which said blade is mounted.

21. The invention defined in claim 20 wherein said slit in the scabbard component is open at its upper end and said slot in the plate of the scabbard extends to said upper end.

22. The invention of claim 20 wherein said latch means comprises a withdrawal prevention element mounted on said scabbard component for movement to and from a position of engagement with said blade, thereby restraining disengagement of said blade component from the scabbard component.

23. The invention defined in claim 22 wherein said withdrawal prevention element is pivotally mounted on said scabbard for swinging to and fro movement, and engageable and disengageable pin means is engageable to couple said withdrawal prevention element and scabbard and lock said withdrawal prevention element in blade restraining position.

24. The invention of claim 19 wherein the upper surface of said blade is concave and said latch means comprises a swing plate having a lower convex surface matching the concavity, mounted to swing about an axis of pivot generative of each convex surface; said latch means further including releasable draw-bolt and socket means for locking said swing plates with the convex surfaces in engagement with the concave surfaces on said blades.

25. A demountable sulky vehicle frame or like frame wherein frame parts such as wheel frames are to be disengageably rigidly secured comprising:
   a. axially aligned and spaced sleeve portions secured to the frame parts to be joined;
   b. a core member received in one of said sleeve portions;
   c. rigid rod means spanning said sleeve portions and having ends disengageably received by said sleeve portions for rotary movement from a first locked position to a second unlocked position;
   d. means for disengageably anchoring said rotatable core member in a position of relative rotation of the rotatable member and the sleeve which receives it; and
   e. aligned disengageable tongue and groove means provided in the ends of said rod means and sleeves to permit lateral bodily withdrawal of said rod means from the sleeves in a direction parallel to the axis of said sleeves in said first position of said rod means;
   f. said rotatable core member having a locking portion interacting with said tongue and groove means and the sleeve portion which receives it to in said first position lock said rod means rigidly in rotated position, and in said second position release said rod means for said lateral bodily withdrawal.

26. The invention of claim 25 wherein said locking portion comprises a groove, receiving tongue means on said rod means, to unite the rod means and core member for rotary 27. The invention of claim 25 wherein a bayonet slot having an axial portion and a lateral portion is provided in each sleeve portion, and rigidly fixed tongues on said rod means at each end are movable therethrough; said core comprises a rotatable plug having a like bayonet slot to receive one of said tongues; said rod means being in locked position when rotated to move said one of said tongues to a rotary position removed from the axial portion of the bayonet slot in said one sleeve; and detent means is provided for locking said plug in position in said one sleeve.

28. The invention of claim 27 wherein said bayonet slot in said one sleeve is cruciate in shape, and said slot in said plug is similarly cruciate.

29. The invention of claim 27 in which said detent means comprises a bale-shaped handle with spring legs pivotally mounted on said one sleeve to swing from a locked position adjacent the sleeve to a raised position, the legs having inturned ends extending through openings in said one sleeve into openings in said plug; and cam means is provided on said one sleeve, in the path of said legs when the handle is swung to raised position, to spread said legs and remove said inturned ends from the openings in said plug.

30. Means for detachably securing wheel frames or the like in a rigidly spaced position comprising:
   a. upright wheel frames in opposed, transversely spaced relation; having transversely extending stub sleeves;
   b. rigid rod means extending between and spanning said frames, and received in said sleeves;
   c. disengageable tongue and groove means mounted on the ends of said rod means and sleeves, said rod means being in one rotary position removable from said sleeves by moving said rod means in a direction parallel to said sleeves, and in another rotary position being locked against such disengaging movement;

d. each sleeve having a bayonet slot, and tongues on said rod means at each end being movable therethrough, f. a rotatable plug provided in one of said sleeves having a like bayonet slot to receive one of said tongues; said rod means being in locked position when rotated to move said one of said tongues to a rotary position removed from the bayonet slot in said one sleeve; and g. detent means is provided for locking said plug in position in said one sleeve, said detent means comprising a releasable plunger and spring means normally urging said plunger to a position locking said plug in a predetermined rotary position.

31. A demountable, three-wheeled vehicle for the handicapped and others desiring assistance comprising:

a. a front wheel drive unit comprising a steering column mounting assembly with a motor driven wheel, the assembly mounting a motor for driving the wheel in rotation;

b. blade and scabboard assemblies including interacting hoe-like blade components and slit-like, transversely extending scabboard components open at one end for receiving one of said blades;

c. a demountable towbar having a front-to-rear extending front portion, and a pair for transversely extending rear portions extending generally perpendicularly to said front portion, each portion terminating in a leg with one of said components fixed thereon at generally right angles to the leg and extending therefrom;

d. a pair of transversely spaced apart, separately demountable, front-to-rear extending wheel frames, each having a stub axle for mounting a rear wheel, and journaling a rear wheel on its axle;

e. one of said components being on said front wheel drive unit and each wheel frame for interacting with an interacting one of the components on the front rear portions of said towbar rspectively;

f. a stop movably mounted for movement transversely to and from a first position engaging the upper portion of each said blade component to prevent its disengaging movement out of a scabboard component to a remote location in which it does not prevent disengagement;

g. latch means for releasably locking each stop in its first position;

h. and a seat and brace means spanning and detachably secured to each of said wheel frames to integrate them and maintain them in rigidly spaced relation.

* * * * *

UNITED STATES PATENT AND TRADEMARK OFFICE
CERTIFICATE OF CORRECTION

PATENT NO. : 4,708,219
DATED : November 24, 1987
INVENTOR(S) : Thomas A. Cresswell It is certified that error appears in the above-identified patent and that said Letters Patent is hereby corrected as shown below:

Column 1, line 4, in the title of the invention, the word "CONDITION" should be deleted.

Column 3, line 49, after the word "that" insert -- an -- .

Column 10, line 29, after the word "rotary" insert -- travel. --.

Column 11, line 26, change "for" to -- of -- .

Signed and Sealed this

Twelfth Day of April, 1988

Attest:

DONALD J. QUIGG

*Attesting Officer*     *Commissioner of Patents and Trademarks*